United States Patent [19]

Miller

[11] Patent Number: 4,893,927

[45] Date of Patent: Jan. 16, 1990

[54] METHOD AND APPARATUS FOR ALIGNING A ZOOM LENS WITH AN IMAGE SENSOR

[75] Inventor: Martin L. Miller, Rochester, N.Y.

[73] Assignee: Eastman Kodak Company, Rochester, N.Y.

[21] Appl. No.: 292,803

[22] Filed: Jan. 3, 1989

[51] Int. Cl.$^4$ ............................................... G01B 9/00
[52] U.S. Cl. ..................................................... 356/127
[58] Field of Search ................................. 356/124, 127

[56] References Cited

U.S. PATENT DOCUMENTS

| | | | |
|---|---|---|---|
| 3,407,018 | 10/1968 | Miller | 350/321 |
| 3,428,915 | 2/1969 | Leone et al. | 372/107 |
| 4,110,046 | 8/1978 | Baker et al. | 356/127 |

Primary Examiner—F. L. Evans
Attorney, Agent, or Firm—James A. Smith

[57] ABSTRACT

A zoom lens is driven by an oscillating drive in continuous motion between different states of magnification to cause an image on a video screen to expand and collapse about the point on the optical axis of the lens. The expanding and collapsing image is viewed on the video screen and the location of the optical axis of the lens assembly is determined by identifying the point on the screen that does not move. The lens assembly is then adjusted so that the stationary point coincides with a reticle at the optical center of the image sensor.

9 Claims, 2 Drawing Sheets

4,893,927

METHOD AND APPARATUS FOR ALIGNING A ZOOM LENS WITH AN IMAGE SENSOR

BACKGROUND OF THE INVENTION

CROSS REFERENCE TO RELATED APPLICATIONS

Reference is made to the following commonly assigned copending applications:

1. U.S. Ser. No. 122,995, now U.S. Pat. No. 4,809,064, entitled ENLARGING PHOTOGRAPHIC PRINTER, filed Nov. 19, 1987 in the names of Shaun M. Amos, Richard J. Backus and Thomas C. Jessop.

2. U.S. Ser. No. 122,996, now U.S. Pat. No. 4,821,073, entitled METHOD AND APPARATUS FOR MEASURING CHARACTERISTICS OF PHOTOGRAPHIC NEGATIVES, filed Nov. 19, 1987, in the names of Patrick A. Cosgrove and Richard J. Backus.

3. U.S. Ser. No. 292,687, entitled LENS ADJUSTMENT APPARATUS, filed concurrently herewith in the name of Thomas C. Jessop.

1. Field of the Invention

This invention relates to alignment apparatus and more specifically to apparatus and a method for aligning a lens assembly with the optical center of an image sensing device in a video camera.

2. Description of the Prior Art

In apparatus of the type disclosed in commonly assigned copending applications Ser. Nos. 122,955 and 122,996 for producing prints of selected portions of negatives two independent optical systems are utilized. One system images the selected portion of the negative on the print paper and the other images the selected portion of the negative on an image sensor to display it on a television screen for customer observation. The customer has control of the negative and can, with the aid of the television system, create and crop the picture he wants. To produce accurate prints corresponding to what the customer sees on the television screen, it is fundamental that the television and printing systems agree for pointing and content.

In apparatus of the type described, accurate alignment of the camera to the zoom lens is required. The point on the sensor that corresponds to the center of the composing frame on the video screen must be on the axis of the zoom lens. This is referred to as the optical center of the sensor. If the optical center of the sensor and the axis of the lens are not coincidental, the image formed at the optical center of the sensor will be a field image for the lens. When the lens is zoomed, the field image will move due to the magnification change and cause a pointing error between the print and video systems.

One method of aligning the zoom lens is to clamp the lens and move a single point target to the zoom lens axis by adjusting the target relative to the lens. When the target appears stationary through a zoom, the camera can be moved relative to the clamped lens and target system to bring the sensor center into alignment with the non-moving target. This procedure is very inconvenient and time-consuming since the lens is supported by the camera.

SUMMARY OF THE INVENTION

It is an object of the present invention to provide a simple, reliable method and apparatus for aligning the optical axis of a zoom lens assembly with the optical center of an image sensor.

In accordance with the invention, a simple procedure is utilized to identify the optical axis. The zoom lens is driven between different states of magnification to cause an image on a video screen to expand and collapse about its center. The expanding and collapsing image is viewed on the video screen and the location of the optical axis of the lens assembly is determined by identifying the point on the video screen that does not move. The lens assembly is then adjusted relative to the image sensor to superimpose the stationary portion on a reticle generated by the image sensor and known to be at the optical center of the sensor.

BRIEF DESCRIPTION OF THE DRAWINGS

Other objects and advantages will become apparent from the following description taken in connection with accompanying drawings wherein.

DETAILED DESCRIPTION OF THE INVENTION

Figure 1:
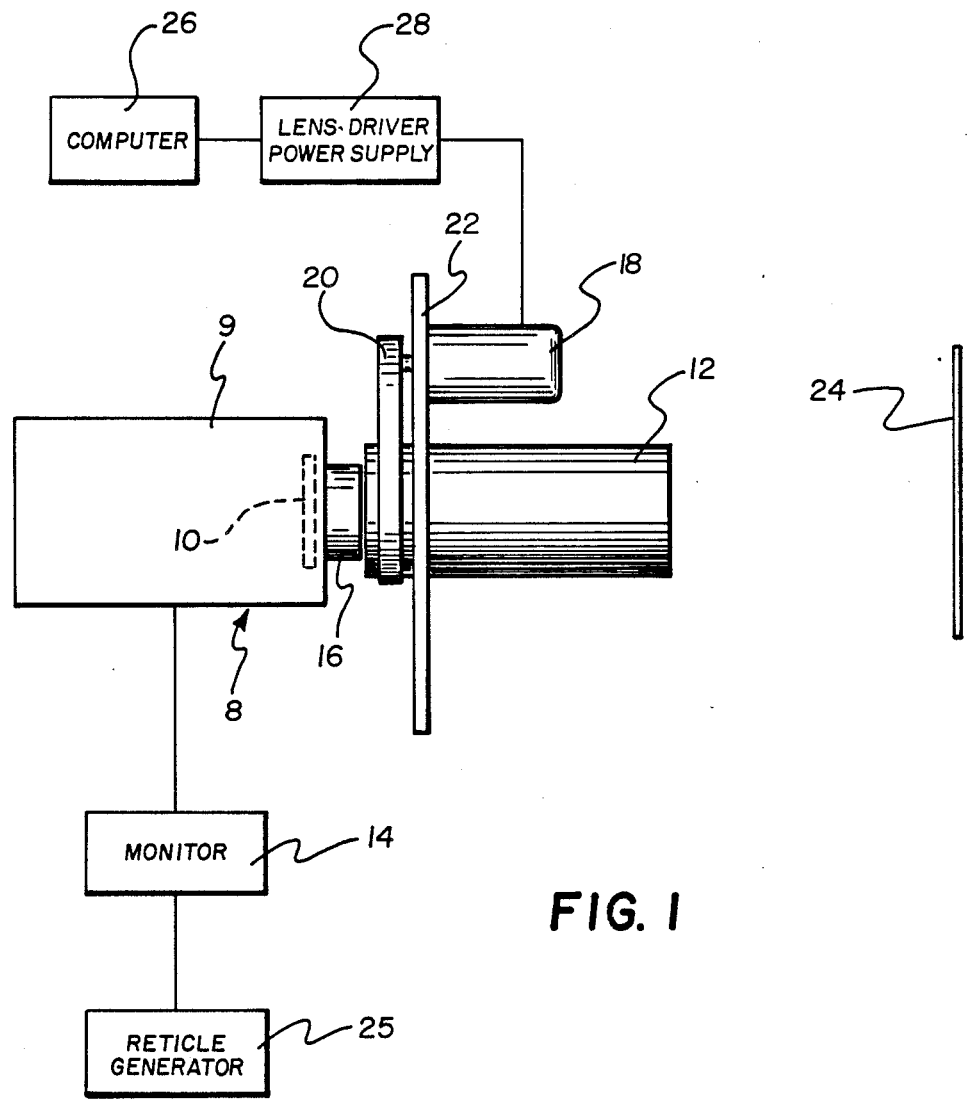
FIG. 1 is a schematic view of a television system incorporating the present invention.
Figure 2:
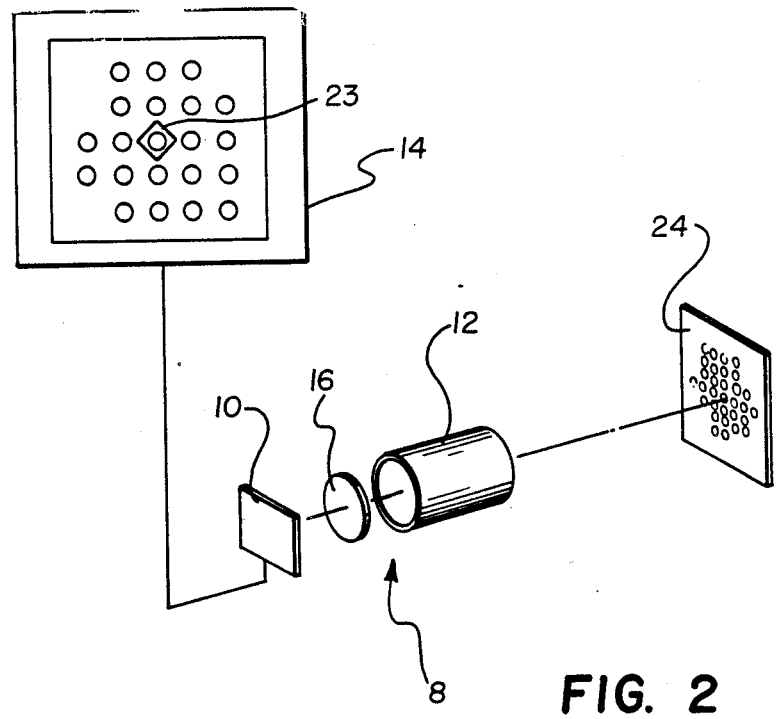
FIG. 2 is a schematic perspective view of the system shown in FIG. 1.

Referring to FIGS. 1 and 2 of the drawings, there is shown schematically video imaging system 8 comprising a video camera 9 having an imaging sensor 10, a zoom lens 12, and a monitor 14. The sensor 10 would preferably take the form of a charge coupled device (CCD) supported within the video camera housing. The housing and lens assembly can be physically coupled by a universal adjustment joint 16 which permits universal movement of the lens assembly relative to the sensor 10. The physical structure of the video camera, lens assembly and adjustment joint may take the form of that disclosed and claimed in commonly assigned copending application Ser. No. 292,687, entitled LENS ADJUSTMENT APPARATUS filed concurrently herewith in the name of Thomas C. Jessop and incorporated herein by reference.

The lens assembly 12 may comprise a typical zoom lens having a barrel containing a plurality of lens elements. A portion of the lens assembly is movable to effect zooming of the lens. In FIG. 1, a drive motor 18 is shown for rotating a portion of the zoom lens by means of a drive belt 20 to effect zooming, the motor being supported on a frame 22 extending from the lens assembly. Such video cameras and power zooming apparatus may take various forms known to those skilled in the art and further description is deemed unnecessary.

In accordance with the invention, the video imaging system 8 is positioned to capture the image of a target or screen 24 having a repeating orthogonal dot patterns. The target image and dot pattern will be displayed on monitor 14 for use in aligning the optical axis of the lens 12 with the optical center of the CCD 10 as will now be described.

To assist in the alignment process, selected areas of the monitor screen are activated by a reticle generator 25 to produce a diamond-shaped reticle image 23 on the monitor screen to identify the center of the composing frame and the optical center of the sensor.

Figure 4:
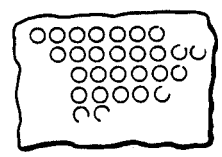
FIGS. 3 and 4 are enlarged fragmentary views of the screen shown in FIG. 2 showing different conditions of operation of the system.
Figure 3:
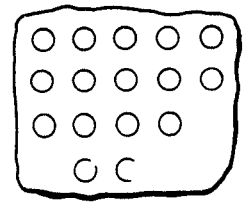

The target image will appear on the monitor screen as a repeating dot pattern, as shown in FIGS. 2, 3 and 4. When the lens is zoomed to maximum magnification, the pattern will be enlarged as shown in FIG. 3. At minimum magnfication, the dot pattern will be reduced in size as shown in FIG. 4. As the lens is zoomed from the state shown in FIG. 4 to that shown in FIG. 3, the dots not on the optical axis of the sensor will appear to move outward. Similarly, when the lens is zoomed back to FIG. 4 magnification, the dots not on the optic axis will appear to move inward. The only point in the image plane that does not move during such zooming is the point or dot coinciding with the optical axis.

The stationary dot is conveniently located by oscillating the zoom lens between its high and low magnification states and observing the dot pattern. This is accomplished by connecting the zoom drive motor to an oscillating drive which is depicted in block diagram in FIG. 3. In the disclosed embodiment, the oscillating drive comprises of a general purpose computer 26 programmed to drive a power supply 28 to produce a sawtooth motion of the zoom lens elements as illustrated in FIG. 1. Such oscillating driving apparatus in general is well known to those skilled in the art and further description is deemed unnecessary. The drive motor will drive the zoom lens in one direction, reverse and then drive it in the opposite direction to produce a rythmatic oscillation of the lens between its two extreme magnification states. If an oscillation frequency is selected in the range of 44 cycles per minutes, the repeating dot pattern will appear to undergo rhythmic zooming and the user need only observe the stationary dot which will be located at the intersection of two lines of dots, one line of whichis moving vertically and the other of which is moving horizontally. After identification of the stationary dot, the lens can be adjusted relative to the camera and CCD as necessary to produce a stationary dot at the CCD optical center defined by the reticle.

The invention thus provides a simple reliable method and apparatus for aligning the optical axis of a zoom lens with the optical center of an image sensor. Specifically the invention eliminates the need to move the target because there is always another dot available on the screen as the optcial axis of the zoom lens is moved over the screen during the adjustment of the lens. The invention thus uses the combination of rhythmic zooming and a screen pattern to achieve simple, accurate alignment.

The screen 24 has been disclosed as a target having a dot pattern printed on its surface. However, it will be apparent to those skilled in the art that other repeating patterns can be employed. For example, the target could be a fabric having a repeating weave pattern that would show a rythmic movement during zooming.

While the invention has been particularly shown and described with reference to a preferred embodiment thereof, it will be understood by those skilled in the art that various changes may be made without departing from the scope of the invention defined by the appended claims.

I claim:

1. A method of aligning the optical axis of a zoom lens with an optical center of an image sensor comprising:
   capturing an image of a target having a pattern with the image sensor;
   moving said lens between different states of magnification;
   displaying the pattern image on a screen while moving said lens;
   observing said pattern during said lens movement;
   identifying a stationary portion of said pattern image during such observation; and
   adjusting said lens relative to the image sensor to cause the stationary portion to coincide with the optical center of the sensor.

2. A method as claimed in claim 1 wherein the target has a dot pattern and a stationary dot is identified as the location of the optical axis of the lens on the dot pattern.

3. A method as claimed in claim 2 wherein the lens is rhythmatically moved between the states of magnification.

4. A method as claimed in claim 3 further including the step of electronically creating a reticle on the screen to identify the optical center of the sensor.

5. Apparatus for aligning the optical axis of a zoom lens with the optical center of an image sensor, said apparatus comprising:
   a target having a repeating pattern adapted to be captured by the sensor;
   means for zooming the lens between different states of magnification; and
   means for displaying the target image during zooming of the lens whereby a stationary portion of the pattern image can be identified to thereby identify the location of the optical axis on the pattern image.

6. Apparatus as claimed in claim 5 wherein said zooming means includes means for oscillating said lens between said magnification states.

7. Apparatus as claimed in claim 6 wherein said pattern is a repeating dot pattern.

8. Apparatus as claimed in claim 6 wherein said target is a fabric having a repeating weave pattern.

9. Apparatus as claimed in claim 6 further including means for electronically establishing a reticle on said display means to identify the optical center of said sensor.

* * * * *

UNITED STATES PATENT AND TRADEMARK OFFICE
CERTIFICATE OF CORRECTION

PATENT NO. : 4,893,927
DATED : January 16, 1990
INVENTOR(S) : Martin L. Miller It is certified that error appears in the above-identified patent and that said Letters Patent is hereby corrected as shown below:

Column 1, Line 21    "concurrently herewith" should read --Jan. 3, 1989--

Column 2, Line 43    "concurrently herewith" should read --Jan. 3, 1989--

Signed and Sealed this

Thirtieth Day of July, 1991

Attest:

HARRY F. MANBECK, JR.

*Attesting Officer*    *Commissioner of Patents and Trademarks*